(12) United States Patent
Shinohara et al.

(10) Patent No.: US 7,516,463 B2
(45) Date of Patent: Apr. 7, 2009

(54) ELECTRONIC APPARATUS

(75) Inventors: Hidenori Shinohara, Hitachinaka (JP); Hiroshi Hoshi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 11/364,986

(22) Filed: Feb. 28, 2006

(65) Prior Publication Data
US 2006/0259916 A1 Nov. 16, 2006

(30) Foreign Application Priority Data
May 12, 2005 (JP) ............................. 2005-139225

(51) Int. Cl.
G11B 17/04 (2006.01)
(52) U.S. Cl. .................................. 720/646
(58) Field of Classification Search ................ 720/646, 720/623, 628, 601, 653, 650, 645, 648, 607, 720/612
See application file for complete search history.

(56) References Cited

U.S. PATENT DOCUMENTS

| | | | | |
|---|---|---|---|---|
| 4,573,092 A | * | 2/1986 | Sugiyama et al. | 360/99.06 |
| 5,210,736 A | * | 5/1993 | Hayama et al. | 720/646 |
| 2005/0022217 A1 | * | 1/2005 | Lee | 720/606 |
| 2005/0237892 A1 | * | 10/2005 | Kuo et al. | 369/75.21 |
| 2006/0064706 A1 | * | 3/2006 | Guo et al. | 720/612 |

FOREIGN PATENT DOCUMENTS

| | | |
|---|---|---|
| JP | 2001-067760 | 1/2001 |
| JP | 2003-281804 A | 10/2003 |
| JP | 2004-310813 | 11/2004 |

OTHER PUBLICATIONS

State Intellectual Property Office of China (SIPO) office action for SIPO patent application CN2006100581221(Sep. 14, 2007).

* cited by examiner

Primary Examiner—Allen T Cao
(74) Attorney, Agent, or Firm—Townsend and Townsend and Crew LLP

(57) ABSTRACT

An electronic apparatus comprises an optical disk drive having an eject button for opening/closing a disk tray and a first controller for controlling the eject button. A tray open/close button controls the disk tray. A second controller controls the disk tray. A mechanism for operating the eject button of the optical disk drive is disposed within a housing of the electronic apparatus and is operated from outside of the housing.

6 Claims, 5 Drawing Sheets

ELECTRONIC APPARATUS

BACKGROUND OF THE INVENTION

1. Field of the Invention

The present invention relates to an electronic apparatus installing an optical disk drive therein.

2. Description of the Related Art(s)

As the conventional art is already known an apparatus, controlling opening/closing of a disk tray of an optical disk drive by using an eject button, which is disposed in a lower portion of the disk tray.

In an information processing apparatus, relating to such conventional art, there is already known a technology or structure of providing an arm portion in a front of the eject button, which is located in the lower portion of the disk tray of the optical disk drive, being supported on the information processing apparatus at one end thereof, while exposing or projecting the other end of the arm portion outside from a housing of the information processing apparatus, at a position other than the lower portion of the disk tray, as an opening/closing button.

In this manner, the eject button of the optical disk drive is used to be a button for opening/closing the tray of the apparatus, while the tray opening/closing button for the apparatus is located at the position other than the lower portion of the disk tray, whereby an operability of the tray opening/closing button cannot be lost when the disk tray is opened. Please see Japanese Patent Laying-Open No. 2001-067760 (2001), for example.

Also, there is known the prior art of enabling to discharge or eject an optical disk, compulsively through operation of a disk discharging mechanism, by using or putting a pin or the like into a through-hole, which is provided on the housing of the optical disk drive, for example, in Japanese Patent Laying-Open No. 2004-310813 (2004).

SUMMARY OF THE INVENTION

In recent years, an electronic apparatus, such as, an optical disk video recorder, etc., for recording/reproducing video/audio signals with applying DVD (Digital Versatile Disc) to be a recording medium therein, appears on the market, and it increases the number thereof, due to less deterioration on the video/audio signals recorded and preferable search ability thereof, on the market.

Ordinarily, the optical disk drive has an eject button for loading/unloading the optical disk, which is controlled by a controller means built within the optical disk drive. Then, for the electronic apparatus, including such the optical disk video recorder or the like, it is common to apply the optical disk drive equipped with the eject button, as it is, for obtaining a compatibility with other equipments, such as, a personal computer, etc., for example.

With such the electronic apparatus, it is common, but not using the eject button of the optical disk drive for opening/closing the disk tray, so as to load or unload the optical disk, there is provided a tray open/close button, newly, so that the opening/closing of the disk tray is controlled by a CPU (Central Processing Unit), as being a controller means for controlling the electronic apparatus as a whole.

The structures of the conventional optical disk video recorder, installing the ordinal optical disk drive therein, will be explained below, by referring to FIG. 6 attached herewith. This FIG. 6 is a block diagram of the conventional optical disk video recorder. The optical disk video recorder 1, having a housing 12 thereof, comprises an optical disk drive 2, a main CPU 3 for conducting the control on an entire of the present recorder, a tray open/close button 4 for opening/closing a disk tray, which is exposed into an outside of the housing, and an open/close switch 5 for detecting pushdown of the tray open/close button 4. Further, the optical disk drive 2 comprises a disk tray 6, being opened/closed for loading/unloading an optical disk (not shown in the figure), an eject button 7 for opening/closing the disk tray 6, which is provided on the optical disk drive 2, an eject switch 8 for detecting push-down of the eject button 7, a drive CPU 9 to be a controller means for controlling the optical disk drive 2 as a whole, a motor 11 to make the disk tray 6 open/close, and a driver circuit 10 for driving the motor 11.

Herein, since the eject button 7 is lies within an inside of the housing 12, but not exposing into an outside thereof, therefore the tray open/close button 4 exposing outside is used for opening/closing the disk tray 6. When the tray open/close button 4 is pushed down, detection is made on the fact that the open/close switch 5 is pushed down by means of the main CPU 3, and then the main CPU 3 interrupts or ends the processing at present, so as to stop the optical disk (not shown in the figure), and transmits an instructive information for opening the disk tray 6 to the drive CPU 9. The drive CPU 9 drives the motor through the driver circuit 10, and it opens the disk tray 6. With doing this, it is possible to take out the optical disk (not shown in the figure) therefrom.

Most recently, advancement is achieved on the electronic apparatus, i.e., such as the optical disk video recorder, etc., in particular, in multifunctional operation thereof, accompanying with the preferable searching capacity thereof, and then the processes to be treated by the CPU controlling the electronic apparatus comes up to be expansive; therefore, increasing the cases where the CPU falls down into hang-up. But, for the electronic apparatus installing the optical disk drive therein, it is important that the optical disk can be taken out even when the CPU hangs up in this manner, from a viewpoint of protecting the optical disk, as well as, satisfying services for a user.

Herein, with the electronic apparatus, such as, the optical disk video recorder, etc., including a CPU for use of the optical disk drive and a CPU for use of controlling the entire of the electronic apparatus, there sometimes occur cases where the CPU for use of the optical disk drive is still operable even when the CPU for use of controlling the entire of the electronic apparatus hangs up, and in such the cases, it is possible to discharge or eject the optical disk by pushing down the eject button of the optical disk drive.

However, in a case of trying to control the disk tray to open/close by means of the CPU for controlling the entire of the optical disk video recorder with newly providing such the tray open/close button as was mentioned above, neither an input button, which is controlled by the CPU, nor the tray open/close button cannot be accepted when the CPU hangs up, and further the eject button of the optical disk cannot be operated since it does not expose into an outside; therefore, there is a problem that it is necessary to make disassembly in order to take out the optical disk therefrom.

Further, there are sometimes cases where a front surface of the optical disk video recorder, on which a through hole is opened, cannot appear on an outside from a viewpoint of an ornamental design thereof, for example, when disposing a design part, such as, a display portion, etc., thereon, and therefore there is a problem that the optical disk cannot be ejected, compulsively, by using a pin.

Such the problems can be dissolved by the invention described in the pending claims.

Thus, according to the present invention, it is possible to take out the optical disk, even when the CPU for use of an equipment, and thereby improving the operability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DESCRIPTION OF THE PREFERRED EMBODIMENTS

Hereinafter, explanation will be made fully on an embodiment according to the present invention, i.e., a DVD recorder, referring to the attached drawings.

Figure 1:
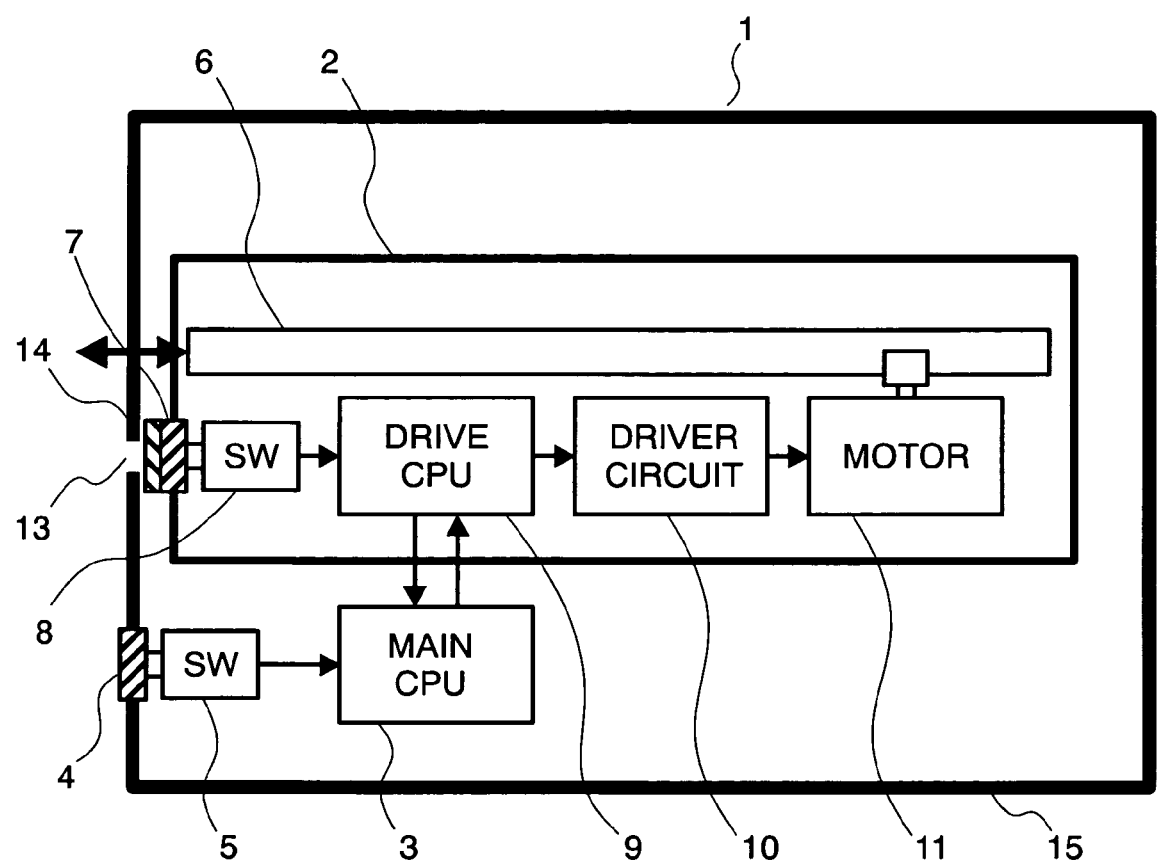
FIG. 1 is a block diagram for showing an optical disk video recorder, according to an embodiment of the present invention.

Explanation will be made about the structures of an optical disk video recorder, which installs an optical disk drive, according to an embodiment of the present invention, by referring to FIG. 1. This FIG. 1 is a block diagram for showing the optical disk video recorder according to the present embodiment.

The optical disk video recorder 1, having a housing 15 thereof, comprises an optical disk drive 2, a main CPU 3 for conducting the control on an entire of the present recorder, a tray open/close button 4 for opening/closing a disk tray, which is exposed into an outside of the housing, and an open/close switch 5 for detecting pushdown of the tray open/close button 4. Further, the optical disk drive 2 comprises a disk tray 6, being opened/closed for loading/unloading an optical disk (not shown in the figure), an eject button 7 for opening/closing the disk tray 6, which is provided on the optical disk drive 2, an eject switch 8 for detecting push-down of the eject button 7, a drive CPU 9 to be a controller means for controlling the optical disk drive 2 as a whole, a motor 11 to make the disk tray 6 open/close, and a driver circuit 10 for driving the motor 11. On the housing 15, there is provided a through hole 13, and behind the through hole 13 is disposed an eject member 14 for pushing down the eject button 7.

Herein, in case when the main CPU 3 hands up, control operation cannot be carried out no more if the open/close switch 5 is turned into ON through push-down of the tray open/close button 4, since the main CPU 3 is in the condition of hang-up, and then the disk tray will not open; i.e., it is impossible to take out the optical disk therefrom. In such case, according to the embodiment of the present invention, it is so constructed that the disk tray 6 can operate to open with using the drive CPU 9, which does not hang up yet. Thus, by pushing down the eject member 14 located behind the through hole 13, with using a pin or the like, being inserted into the through hole 13, the eject button 7 is pushed down, and then the drive CPU 9 detects ON condition of the eject switch 8. After stopping an optical disk (not shown in the figure), the drive CPU 9 drives the motor 11 through the driver circuit 10, to open the disk tray 6, thereby discharging or ejecting the optical disk. With doing this, even if the main CPU 3 is hangs up, it is possible to take out the optical disk (not shown in the figure) therefrom.

According to the present embodiment, the eject button 7 does not come out on the housing surface, so as not to be pushed down erroneously, under the normal condition thereof, in the constructions thereof. This is for the purpose of letting both the CPUs to escape from the enlarging process loads thereupon, because there are generated necessities of adding a special process, such as, an interruption process, etc., for interrupting the operation thereof, from the drive CPU 9 to the main CPU 3 when the eject button 7 is pushed down, erroneously, during the operation of present recorder. Also, by making the through hole 13 as small as the pin can pass through, it is not remarkable; therefore, it does not disturb or hamper the design thereof.

Although the optical disk video recorder includes means for recording or reproducing the optical disk, and/or receiving means for receiving broadcasting signals, etc., however explanations thereof are omitted in the block diagram of the present embodiment.

Figure 2:
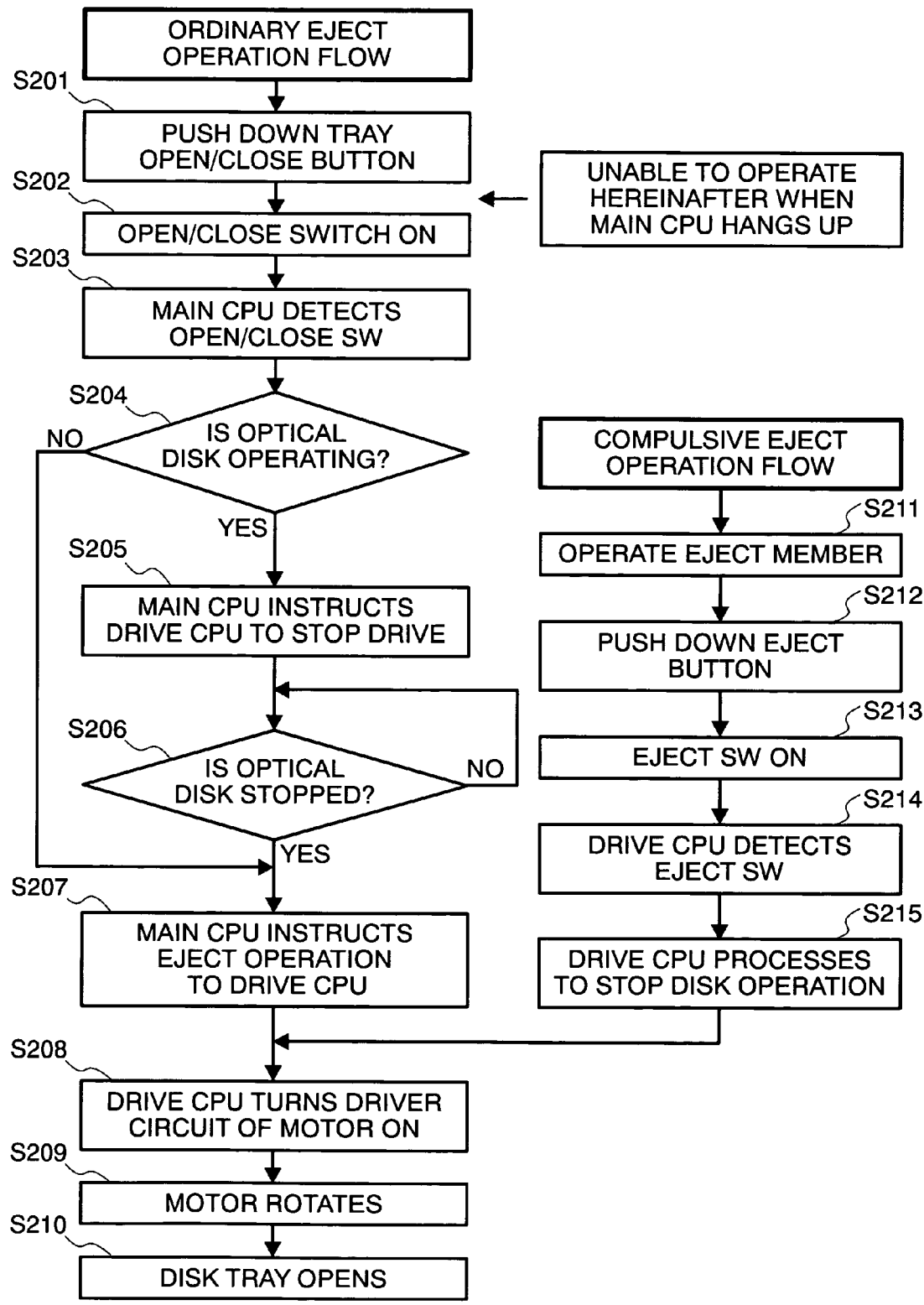
FIG. 2 is a flowchart for showing an eject operation, according to the embodiment of the present invention.

Next, explanation will be given about the flow of processes for taking out the optical disk through opening the disk tray 6, by referring to FIG. 2. This FIG. 2 shows the flowchart of eject operation according to the present embodiment.

First of all, explanation will be given about the eject operation during the normal operation thereof. Under the condition of the normal operation, when the tray open/close button 4 is pushed down in a step S201, the open/close switch 5 turns ON in a step S202, and the main CPU 3 detects that the open/close switch 5 is turned ON in a step S203. In a step S204 is made determination upon a present operating condition, and in a case if the optical disk does not operate (i.e., "NO"), the main CPU 3 gives an eject instruction to the drive CPU 9 in a step S207. In a case if the optical disk is operating in the step S204 (i.e., "YES"), the main CPU 3 gives an instruction to the drive CPU 9 to stop the optical disk drive 2 in a step S205, and it makes a determination on whether the optical disk is stopped or not in a step S206. If the optical disk is stopped (i.e., "YES"), the main CPU 3 gives an eject instruction to the drive CPU 9 in a step S207. In a step S208, the drive CPU 10 turns the driver circuit 10 ON, so as to drive the motor 11, and brings the motor to rotate in a step S209. In a step S210, since the disk tray 6 is opened through rotation of the motor 11, and then it is possible to take out the optical disk therefrom.

Next, explanation will be made about the compulsive eject operation when the main CPU 3 hangs up. When the main CPU 3 is in the condition of hang-up, the main CPU 3 does not detect the fact that the open/close switch 5 is turned ON in the step S203 even if the open/close switch 5 is ON through pushdown of the tray open/close button 4 in the step 201, and therefore it does not carry out the operations after this. In such the case, when making an operation of pushing the eject member 14 in a step S211, with using the pin, etc., inserting it into the through hole 13, then the eject button 7 is pushed down in a step S212, and the eject switch 7 is turned ON in a step S213.

In a step S214, the drive CPU 9 makes detection on that the eject switch 7 is turned ON, and in a step S215 the drive CPU 9 starts a process for stopping the operation of the optical disk while interrupting the control operation upon the control instruction from the main CPU 3, and it advances into the step S208, thereby turning the driver circuit ON. In the step S209, it rotates the motor 11, and in the step S210, the disk tray 6 is opened due to the rotation of the motor 11, therefore the optical disk can be discharged into the outside. In this manner, with the present embodiment, it is possible to open the disk tray 6, compulsively, discharging the optical disk outside, thereby to be taken out.

Figure 3:
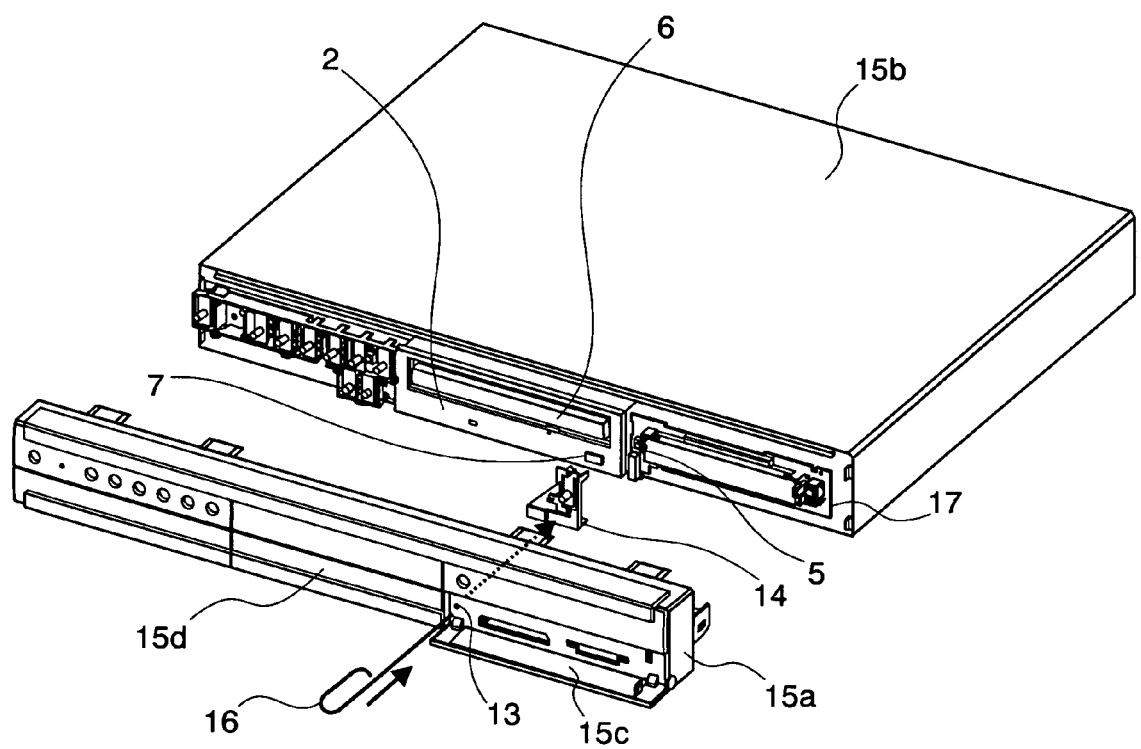
FIG. 3 is an exploded view of a front surface of the optical disk video recorder, according to the embodiment of the present invention.
Figure 4:
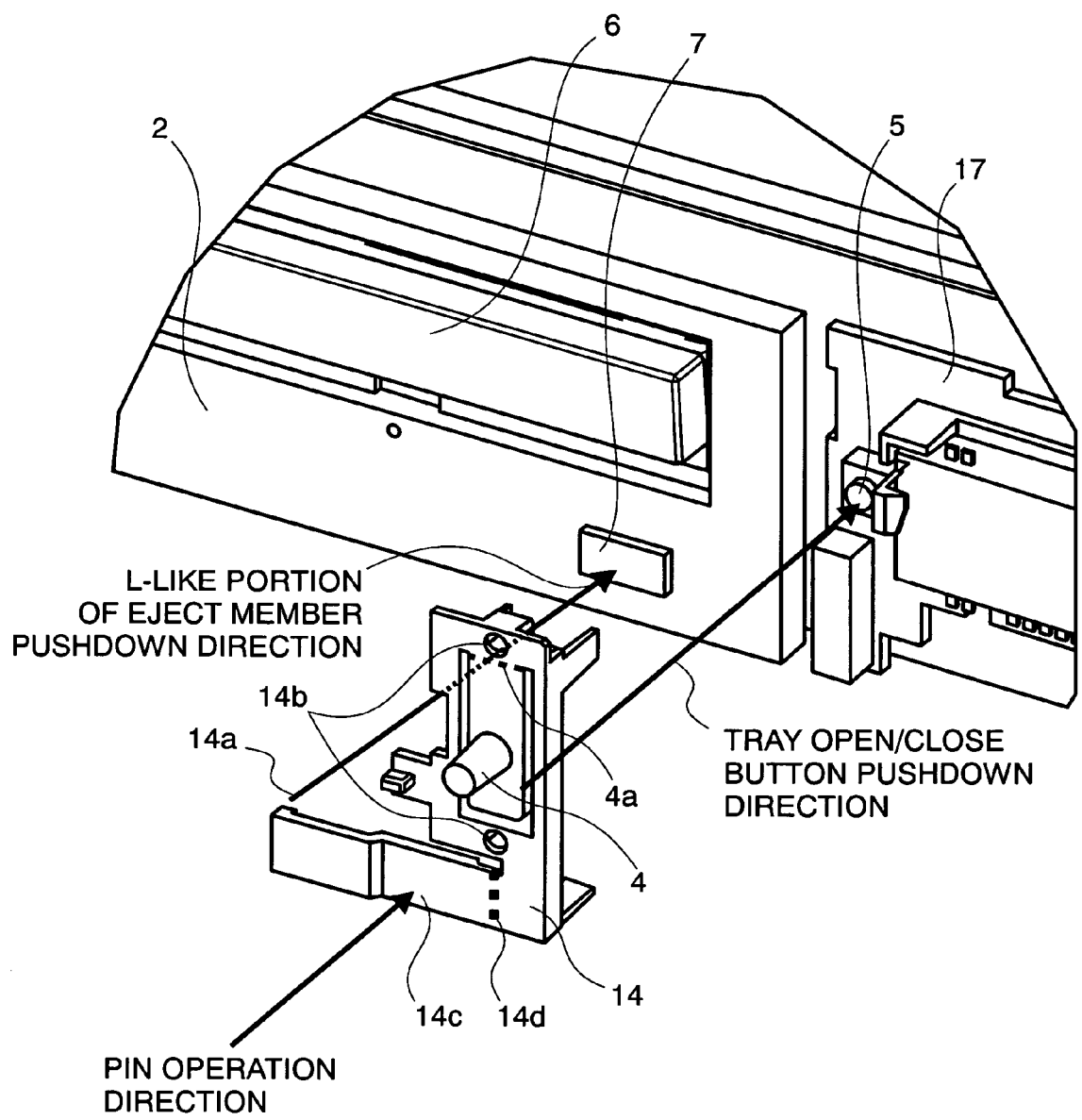
FIG. 4 is an enlarged view of an eject button operating portion of the optical disk video recorder, according to the embodiment of the present invention.
Figure 5:
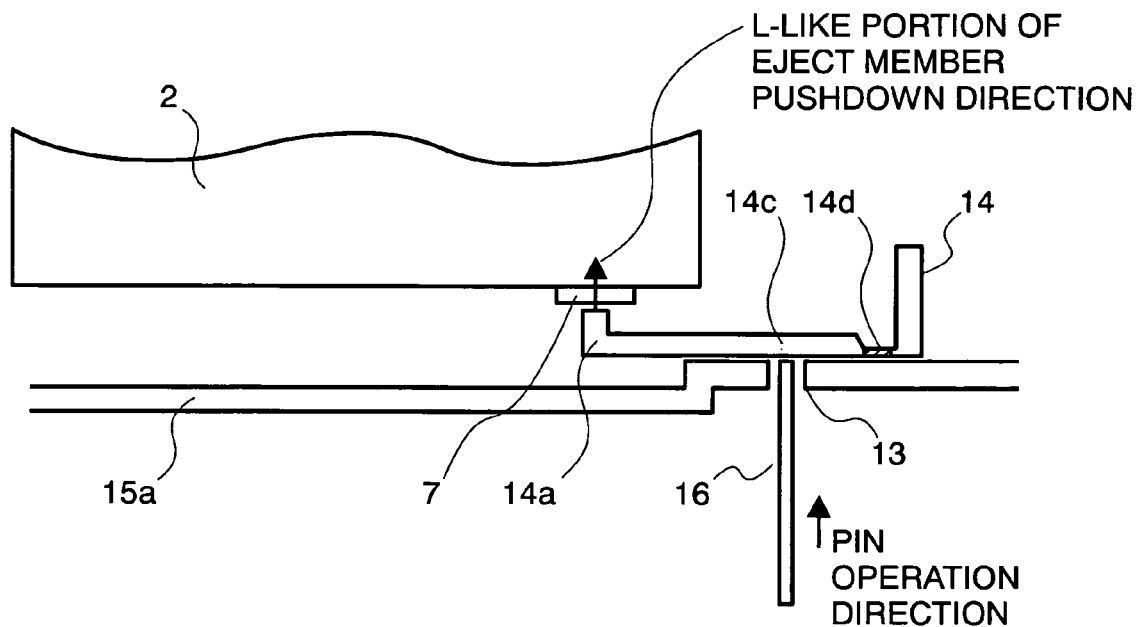
FIG. 5 is an upper view of the eject button operating portion of the optical disk video recorder, according to the embodiment of the present invention.
Figure 6:
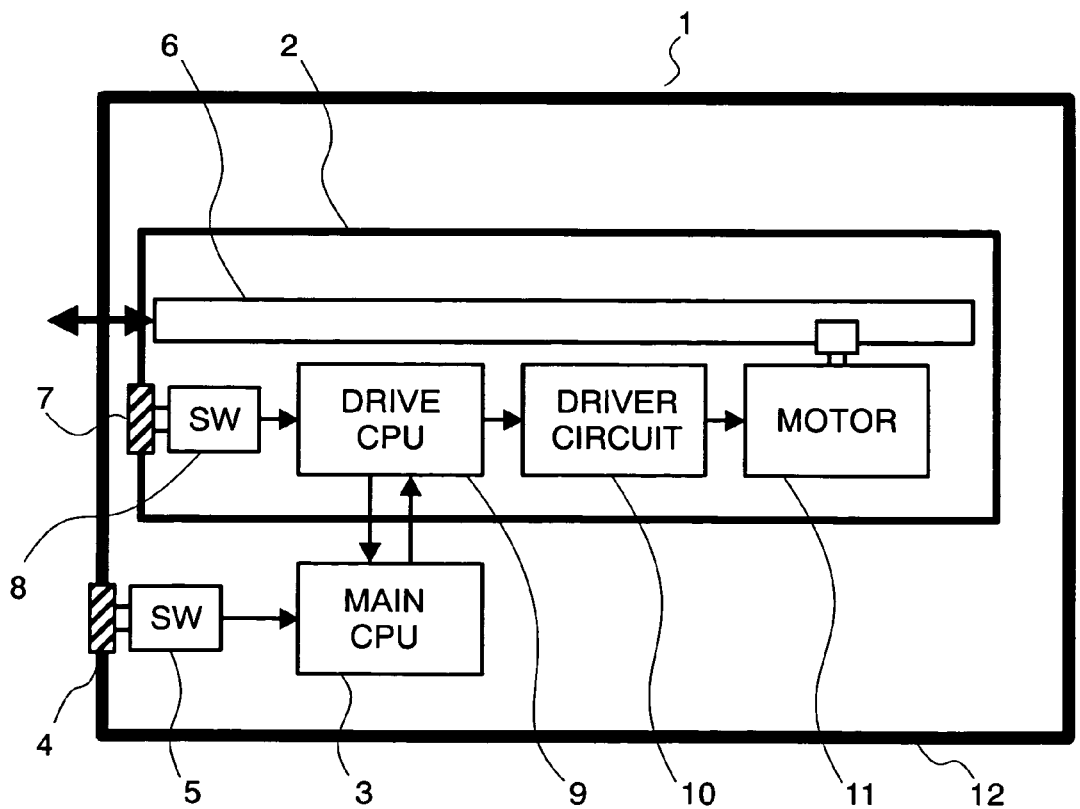
FIG. 6 is a block diagram for showing the optical disk video recorder relating to the prior art.

Next, explanation will be made about the structures of a means, for operating the eject button 7 of the optical disk drive 2 from an outside thereof, in the optical disk video recorder according to the present embodiment, by referring to FIGS. 3 to 5. This FIG. 3 is the exploded view of a front surface of the optical disk video recorder, according to the present embodiment.

The housing 15 of the optical disk video recorder builds up a box-like shape with a front case 15*a*, a top cover 15*b* and other housing(s) other than that. In vicinity of a center of the box-like housing, within an inside thereof, there is disposed the optical disk drive 2 having the eject button 7, and on the right-hand side thereof is disposed a front substrate 17, which mounts the tray open/close switch 7 thereon. Also, the front case 15*a* has a door 15*c* that can open or close, and the through hole 13 is opened on the surface appearing when opening that door 15*c*. Behind the through hole 13 is disposed the eject member 14 for pushing down the eject button 7, so that the eject button 7 can be pushed down when the eject member 14 is pushed by means of the pin 16 passing through the through hole 13, in the structures thereof.

Herein, since the eject button 7 is disposed in a lower portion of the disk tray 6, and on a front surface portion 15*d* of the front panel in front thereof, no hole can be opened because it builds up the ornamental design surface on the outlook thereof, therefore the position of the through hole 13, for letting the pin 16 to pass through by means of the eject member 14, is located aside, not coming into the lower portion of the disk tray 6. For this reason, the operability can be improved, in particular, when opening the disk tray 6 by means of the pin 16, as well as, escaping from the restrictions on the design thereof.

Also, according to the present embodiment, the through hole 13 can be hidden by the door 15*c*, and further enables to escape from the restrictions on the design thereof.

Further, the structures of an eject button operating portion will be explained in details, by referring to FIG. 4. This FIG. 4 is an enlarged view of the eject button operating portion of the optical disk video recorder according to the present embodiment.

The eject member 14 has a L-like portion 14*a* of the eject member for pushing down the eject button 7, and is fixed on the front case 15*a* by two (2) pieces of boss holes 14*b*. Further, the tray open/close button 4 is also made up as a member, exposing outside from the hole of the front case 15*a*.

Herein, when the tray open/close button 4 is pushed down, the tray open/close button 4 moves around a fulcrum 4*a* into a direction of pushing down the tray open/close button, and it pushes the open/close switch 5 disposed on the front substrate 17 through a boss (not shown in the figure) provided behind the tray open/close button 4, thereby turning it ON. Also, when pushing down the eject member operating portion 14*c* into the direction for operating the pin, passing the pin 16 through the through hole 13, the eject member 14*a* moves around a fulcrum 4*d* into a direction of pushing down the L-like member of the eject member, thereby pushing down the eject button 7. In this manner, the pushdown portion is shifted with utilizing the rotation around the fulcrum 4*d*, so that the through hole 13 does not falls within the lower portion of the disk tray 6; therefore, improvement can be obtained, in particular, when opening the disk tray 6.

According to the present embodiment, the tray open/close button 4 and the eject member 14 are formed into one (1) piece of member; therefore, consideration is paid for lessening the cost up. Herein, the tray open/close button 4 and the eject member 14 may be formed, separately, to be members differing from each other.

Further, explanation will be given about the positional relationship of the eject button operating portion, by referring to FIG. 5. This FIG. 5 is an upper view of the eject button operating portion of the optical disk video recorder, according to the present embodiment.

The eject member 14 is fixed on the front case 15*a*, and when pushing the eject member operating portion 14*c* to the pin operating direction by means of the pin 16 passing through the through hole 13, the L-like portion 14*a* of the eject member moves into the direction of pushing down the eject member, thereby pushing down the eject button 7. In this manner, the pushdown portion is shifted with utilizing the rotation around the fulcrum 4*d*, so that the through hole 13 does not falls within the lower portion of the disk tray 6; therefore, improvement can be obtained, in particular, when opening the disk tray 6.

According to the present embodiment, within an electronic apparatus, comprises: an optical disk drive having an eject button for opening/closing a disk tray and a controller means 1 for controlling and instructing said eject button; a tray open/close button for opening/closing said disk tray; and a controller means 2 for controlling opening/closing of said disk tray, it is characterized by further providing a means for operating said eject button of said optical disk drive, which is disposed within a housing of the present electronic apparatus, from an outside thereof.

With this, it is possible to take out the optical disk by means of the eject button of the optical disk drive and through control of the CPU for the drive, irrespective of the operation of the CPU for equipment, controlling the entire of the present electronic apparatus.

Further, it is characterized that said disk tray is opened and/or closed responding to an input from said eject button in case when said controller means 2 does not respond to an input from said tray open/close button. With this, it is possible to take out the optical disk by means of the eject button of the optical disk drive, which is operable, and through control of the CPU for the drive, even when the CPU for equipment, controlling the entire of the present electronic apparatus, hangs up.

Further, it is characterized in that said eject button is disposed within an inside of the housing of the present electronic apparatus, and the eject member for pushing down said eject member is disposed behind a throughhole, which is provided on said housing. With this, since the eject button is hidden by the housing, though the optical disk can be discharged by the tray open/close button, ordinarily, but also the optical disk can be taken out by pushdown of the eject button, through pushing down the eject member from the through hole by inserting a pin therein, only during an abnormal time when the CPU for equipment, controlling the entire of the present electronic apparatus, hangs up. Also, the through hole is small, and is difficult to be remarked; therefore it hardly disturb on the design thereof.

Further, it is characterized in that said eject button is disposed in a lower portion of said disk tray, and said through hole is disposed in other than the lower portion of said disk tray. With this, it is possible to push down the eject button, through pushing the eject member by the pin inserted into the through hole, which is disposed at a position aside the optical disk drive, even if the ornamental design part, such as, a display portion, etc., is positioned on the front surface of the optical disk drive, or when the surface of the optical disk drive, on which the through hole is opened, cannot be exposed outside from a viewpoint of the ornamental design thereof; thereby enabling the optical disk to be taken out, with preferable operability.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An electronic apparatus, comprising:
   an optical disk drive, having an eject button for opening/closing a disk tray, and a first controller means for controlling and instructing said eject button;
   a tray open/close button for opening/closing said disk tray;
   a second controller means for controlling opening/closing of said disk tray; and
   a means for operating said eject button of said optical disk drive, which is disposed within a housing of said electronic apparatus, from an outside thereof.

2. The electronic apparatus, as described in the claim 1, wherein said disk tray is opened and/or closed responding to an input from said eject button in case, when said second controller means does not respond to an input from said tray open/close button.

3. The electronic apparatus, as described in the claim 1, wherein said eject button is disposed within an inside of the housing of the present electronic apparatus, and a member for pushing down said eject member is disposed behind a through hole, which is provided on said housing.

4. The electronic apparatus, as described in the claim 3, wherein said eject button is disposed in a lower portion of said disk tray, and said through hole is disposed in other than a front surface of said disk tray.

5. The electronic apparatus, as described in the claim 2, wherein said eject button is disposed within an inside of the housing of the present electronic apparatus, and a member for pushing down said eject member is disposed behind a through hole, which is provided on said housing.

6. The electronic apparatus, as described in the claim 5, wherein said eject button is disposed in a lower portion of said disk tray, and said through hole is disposed in other than a front surface of said disk tray.

* * * * *